United States Patent
Dornieden et al.

(10) Patent No.: US 9,421,971 B2
(45) Date of Patent: Aug. 23, 2016

(54) METHOD FOR A DRIVER ASSISTANCE SYSTEM OF A VEHICLE

(71) Applicant: VOLKSWAGEN AG, Wolfsburg (DE)

(72) Inventors: Bernd Dornieden, Braunschweig (DE); Lutz Junge, Braunschweig (DE); Patrick Pascheka, Braunschweig (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 14/413,291

(22) PCT Filed: Jun. 18, 2013

(86) PCT No.: PCT/EP2013/062577
§ 371 (c)(1),
(2) Date: Jan. 7, 2015

(87) PCT Pub. No.: WO2014/009108
PCT Pub. Date: Jan. 16, 2014

(65) Prior Publication Data
US 2015/0142287 A1    May 21, 2015

(30) Foreign Application Priority Data
Jul. 7, 2012    (DE) .......................... 10 2012 013 689

(51) Int. Cl.
*G06F 7/70*    (2006.01)
*G06F 19/00*    (2011.01)
*G06G 7/00*    (2006.01)
*G06G 7/76*    (2006.01)
*B60W 30/00*    (2006.01)
(Continued)

(52) U.S. Cl.
CPC *B60W 30/00* (2013.01); *B60T 7/12* (2013.01); *B60W 30/16* (2013.01); *B60W 30/18127* (2013.01); *B60W 2030/1809* (2013.01); *B60W 2550/302* (2013.01); *B60W 2550/306* (2013.01); *B60W 2550/308* (2013.01)

(58) Field of Classification Search
CPC .......... B60W 30/16; B60W 30/00; B60T 7/12
USPC ........................................... 701/70
See application file for complete search history.

(56) References Cited

U.S. PATENT DOCUMENTS

2002/0121398 A1 * 9/2002 Kikuchi ............. B60K 31/0008
180/169

FOREIGN PATENT DOCUMENTS

DE    102004017115 A1    10/2005
DE    102008005328 A1    7/2008
(Continued)

OTHER PUBLICATIONS

Search Report for German Patent Application No. 10 2012 013 689.7; Feb. 20, 2013.
(Continued)

*Primary Examiner* — Maceeh Anwari
(74) *Attorney, Agent, or Firm* — Barnes & Thornburg LLP

(57) ABSTRACT

A driver assistance system of a vehicle for controlling a distance from the vehicle to a further vehicle. In the method, a distance between the vehicle and the further vehicle and a relative speed between the vehicle and the further vehicle are determined. When the vehicle approaches the further vehicle, the vehicle is operated in an operational state from a group of a plurality of predetermined operational states in dependence upon the distance and the relative speed.

27 Claims, 5 Drawing Sheets

(51) Int. Cl.
*B60W 30/16* (2012.01)
*B60T 7/12* (2006.01)
*B60W 30/18* (2012.01)

(56) References Cited

FOREIGN PATENT DOCUMENTS

| | | |
|---|---|---|
| DE | 102008000131 A1 | 7/2009 |
| DE | 102008000696 A1 | 9/2009 |
| DE | 102009002521 A1 | 10/2010 |
| DE | 102009028242 A1 | 2/2011 |
| DE | 102009046340 A1 | 5/2011 |
| DE | 102009046341 A1 | 5/2011 |
| DE | 102010031382 A1 | 1/2012 |
| DE | 102010031382 A1 * | 1/2012 |
| DE | 102011109039 A1 | 1/2012 |
| DE | 1020100052964 A1 | 5/2012 |
| DE | 102011121853 A1 | 6/2012 |
| EP | 2163449 A2 | 3/2010 |

OTHER PUBLICATIONS

Search Report for International Patent Application No. PCT/EP2013/062577; Sep. 20, 2013.

\* cited by examiner

- ▨ acceleration
- ▥ constant speed
- ▧ freewheeling
- ▨ coasting
- ▨ coasting +regeneration/brake

METHOD FOR A DRIVER ASSISTANCE SYSTEM OF A VEHICLE

PRIORITY CLAIM

This patent application is a U.S. National Phase of International Patent Application No. PCT/EP2013/062577, filed 18 Jun. 2013, which claims priority to German Patent Application No. 10 2012 013 689.7, filed 7 Jul. 2012, the disclosures of which are incorporated herein by reference in their entirety.

SUMMARY

Exemplary embodiments relate to a method for a driver assistance system in a vehicle and to a corresponding driver assistance system. Exemplary embodiments relate particularly to a driver assistance system for automatically regulating a distance between the system's own vehicle, that is known as the ego vehicle, and a vehicle traveling ahead.

Disclosed embodiments provide an improved method, particularly a more energy-efficient method, for automatic distance regulation in a driver assistance system.

BRIEF DESCRIPTION OF THE DRAWINGS

The disclosed embodiments are described in detail below with reference to the drawing.

DETAILED DESCRIPTION OF THE DISCLOSED EMBODIMENTS

Figure 1:
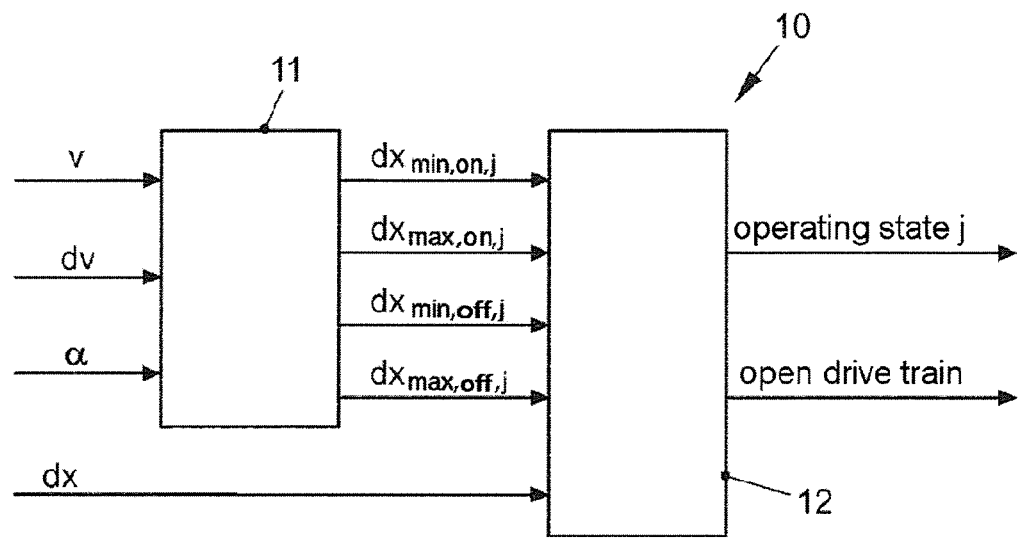
FIG. 1 shows a schematic illustration of a driver assistance system according to at least one disclosed embodiment.

A method for a driver assistance system in a vehicle is provided. The driver assistance system is used for controlling or regulating a distance from the vehicle to a further vehicle. The method prompts determination of a distance between the vehicle and the further vehicle and determination of a relative speed between the vehicle and the further vehicle. When the vehicle approaches the further vehicle, the vehicle is operated in an operating state from a group of a plurality of prescribed operating states. The operating state selected for operation of the vehicle from the group of the plurality of prescribed operating states is selected on the basis of the distance and the relative speed. The prescribed operating states can be chosen such that energy-inefficient operating states are precluded. Since the vehicle selects one of the prescribed operating states when approaching the further vehicle, energy-inefficient operation of the vehicle can be avoided. This allows energy consumption by the vehicle to be decreased particularly when the vehicle approaches the further vehicle.

Whether or not the vehicle is approaching the further vehicle can be ascertained on the basis of the relative speed, for example.

According to at least one disclosed embodiment, the vehicle comprises a drive train between a drive motor of the vehicle and drive wheels of the vehicle. The drive train may be either open or closed. When the drive train is open, there is no mechanical coupling between the drive motor and the drive wheels. When the drive train is closed, there is mechanical coupling between the drive motor and the drive wheels. In this disclosed embodiment, the group of the plurality of prescribed operating states does not comprise an operating state in which the drive train is closed and the drive motor is dragged by the movement of the vehicle and the drive motor draws energy to decrease its drag braking. In other words, an operating state is avoided in which, when the drive train is closed, the drive motor is dragged by the movement of the vehicle and simultaneously draws energy, for example, fuel, to decrease the deceleration of the vehicle that is conditional upon the drag operation. Such operation of the vehicle is generally associated with poor efficiency. It is therefore advantageous that the group of the plurality of prescribed operating states explicitly precludes this operating state, as a result of which the vehicle avoids this operating state when approaching the further vehicle.

According to a further disclosed embodiment, the group of the plurality of prescribed operating states comprises at least one operating state in which the drive train of the vehicle is open. Operation of the vehicle with the drive train open is also referred to as freewheeling mode or sailing mode, depending on whether the drive motor decoupled from the drive wheels continues to run in idling mode or is switched off. In sailing or freewheeling mode, the vehicle can be operated in a particularly energy-efficient manner, since the vehicle is not decelerated by means of drag operation of the drive motor and hence a loss of speed at extremely low energy consumption is low.

According to a further disclosed embodiment, the group of the plurality of prescribed operating states consists of the following operating states:

constant speed mode: the drive motor outputs a driving torque to the drive wheels of the vehicle via the closed drive train. The vehicle is therefore driven by means of the drive motor. Optionally, the vehicle is driven at constant speed when the speed of the drive motor is constant.

Freewheeling mode: the drive train of the vehicle between the drive motor and the drive wheels is open and the drive motor continues to run in idling mode.

Coasting mode: the drive train of the vehicle is closed and the drive motor is dragged by the movement of the vehicle. However, the drive motor draws no additional energy, for example, fuel, in this coasting mode. In other words, the drive motor is kept in motion solely by means of the drive train of the vehicle on account of the movement of the vehicle.

Sailing mode: in sailing mode, the drive train of the vehicle is open and the drive motor is switched off. In this mode, the drive motor draws no additional power, for example, fuel.

Recuperation mode: In recuperation mode, kinetic energy from the vehicle is converted into an energy that can be stored in an energy store of the vehicle and is stored. By way of example, the vehicle may comprise current generators that are coupled to the drive wheels and that produce electric power that can be stored in a storage battery or a fuel cell of the vehicle, for example. Alternatively, in recuperation mode, it is also possible to use a drive of the internal combustion engine and of an alternator connected thereto, for example, to convert kinetic energy from the vehicle into electric power that is stored in a starter battery of the vehicle. In addition, the vehicle may alternatively or additionally comprise, by way of example, mechanical energy stores, such as spring energy stores or flywheel energy stores.

Braking mode: in this case, a braking system of the vehicle, for example a mechanically, hydraulically or pneumatically driven friction braking system, is operated. In braking mode, kinetic energy from the vehicle is converted into heat, for example.

Combination of the operating states described above: some of the operating states described above can be combined with one another, for example the recuperation mode can be combined with the braking mode, sailing mode, coasting mode or freewheeling mode and possibly even with the constant speed mode. Similarly, the braking mode can be combined with the coasting mode or the recuperation mode, for example.

The operating states described above each have a very high level of energy efficiency on their own. Since the vehicle is operated only in one of the operating states described above when approaching the further vehicle, it is possible to ensure that the further vehicle is approached in an energy-efficient manner.

According to a further disclosed embodiment, the method additionally comprises determination of a target distance between the vehicle and the further vehicle on the basis of a speed of the vehicle and the relative speed. When the vehicle approaches the further vehicle, the vehicle is operated in one of the operating states from the group of the plurality of prescribed operating states on the basis of the distance between the vehicle and the further vehicle and the target distance. By determining and taking account of the target distance on the basis of the speed of the vehicle, it is possible to comply with legal requirements on a minimum distance, for example. Furthermore, the target distance can be influenced by a driver of the vehicle by means of an adjusting means, for example. This allows the target distance to be increased or reduced according to the desires of the driver, particularly taking account of legal requirements.

According to a further disclosed embodiment, the method prompts association of a respective distance range with each of the operating states of the group of the plurality of prescribed operating states. The respective distance range is determined on the basis of a speed of the vehicle and the relative speed. When the vehicle approaches the further vehicle and the distance between the vehicle and the further vehicle is in a distance range that is associated with one of the operating states, the vehicle is operated in the associated operating state. Since the distance ranges are determined dynamically on the basis of the speed of the vehicle and the relative speed, the operating states from the group of the plurality of prescribed operating states can be selected in an energy-efficient manner. To provide a predetermined deceleration for the vehicle, for example, the deceleration can be achieved by a sailing mode, for example, on account of the high level of drag when the vehicle is at high speed, for example, whereas the same deceleration can be achieved by a coasting mode or recuperation mode at low speed.

According to a further disclosed embodiment, an activation distance range and a deactivation distance range are respectively associated with each of the operating states of the group of the plurality of prescribed operating states. The activation distance range is determined on the basis of the speed of the vehicle and the relative speed. The deactivation distance range is determined on the basis of the speed of the vehicle and the relative speed. Operation of the vehicle in one of the operating states from the group of the plurality of prescribed operating states is begun when the vehicle approaches the further vehicle and the distance between the vehicle and the further vehicle is in the activation distance range associated with this operating state. Operation in this previously begun operating state is terminated when the distance between the vehicle and the further vehicle is outside the deactivation distance range associated with this operating state. The use of activation distance ranges and deactivation distance ranges for activating and deactivating the respective operating states makes it a simple matter to achieve hysteresis, as a result of which it is possible to avoid unnecessarily frequent changes of operating state between two operating states under constraints. This allows an improvement in driving comfort for a driver of the vehicle.

According to a further disclosed embodiment, the method also involves determination of a model of vehicle dynamics of the vehicle. The target distances, distance ranges, activation distance ranges or deactivation distance ranges described above are additionally determined on the basis of the model of the vehicle dynamics. By way of example, the vehicle dynamics may comprise one or more of the following parameters:

vehicle mass,
drag coefficient,
reference area,
rolling resistance coefficient,
translation-dependent supplementary terms,
wind speed,
wind direction,
precipitation intensity,
gradient of a section ahead of the vehicle,
road class such as freeway, country road, city, etc.,
number of lanes,
speed limit, or
overtaking restrictions.

The use of the model of the vehicle dynamics allows the prescribed operating states to be used more energy-efficiently.

According to a further disclosed embodiment, the method prompts determination of the target distance, the distance range, the activation distance range and/or the deactivation distance range additionally on the basis of a driving mode that can be set by a user or driver of the vehicle. By way of example, the driving mode may comprise a sports mode or an energy saving mode. In addition, the driving mode may be variably adjustable continuously between the sports mode and the energy saving mode by means of a roller or a rotary control, for example, on a steering wheel of the vehicle, for example. This allows driving dynamics that the driver desires to be achieved in the distance regulation system.

A piece of information about the currently selected operating state in which the vehicle is currently being operated or a piece of information about a future operating state in which the vehicle will probably be operated next can be output to a driver of the vehicle. By way of example, the output can be displayed in a combined instrument or by means of what is known as a head-up display in a windshield of the vehicle. By way of example, the display can be presented by means of graphical highlights, such as colored marking, of the distance ranges in which the respective operating states are activated. Since the driver is shown the energy-efficient operation of the driver assistance system, it is possible to achieve improved comprehension of energy-efficient driving for the driver.

A driver assistance system for a vehicle for controlling a distance from the vehicle to a further vehicle is additionally provided. The driver assistance system comprises a sensor for determining a distance between the vehicle and the further vehicle, and a control unit. The control unit is capable of determining a relative speed between the vehicle and the further vehicle on the basis of a change in the distance between the vehicle and the further vehicle and of operating the vehicle in an operating state from a group of a plurality of prescribed operating states on the basis of the distance and the relative speed when the control unit has established that the vehicle is approaching the further vehicle. The driver assistance system may be designed to carry out the method described above and one of the embodiments thereof and therefore also comprises the advantages described above.

A vehicle having the driver assistance system described above is additionally provided.

FIG. 1 shows a driver assistance system 10 for a vehicle for controlling or regulating a distance from the vehicle to a further vehicle. The driver assistance system comprises sensors (not shown) for determining a current speed v of the vehicle and for determining a distance dx from the vehicle to the further vehicle. A control unit (not shown) is used to determine a relative speed dv between the vehicle and the further vehicle, for example on the basis of a change in the distance dx. A further control unit 11 of the driver assistance system 10 is supplied with the speed v, the relative speed dv and further parameters, which can relate to vehicle dynamics, for example. FIG. 1 shows a gradient a for a journey section ahead of the vehicle as a further parameter by way of example. The control unit 11 takes the speed v, the relative speed dv, and the gradient a as a basis for respectively determining an activation distance range and a deactivation distance range for each operating state from a group of a plurality of prescribed operating states. The activation distance range is defined by means of a minimum activation distance dxmin,on,j for each operating state j and a maximum distance dxmax,on,j. Similarly, a corresponding deactivation distance range is defined for each operating state j by means of a minimum distance dxmin,off,j and a maximum distance dxmax,off,j. An operating state j from the prescribed group of operating states is activated by a control unit 12 when the current distance dx between the vehicle and the further vehicle is in the range dxmin,on,j to dxmax,on,j. The activated operating state j is deactivated by the control unit 12 when the current distance dx is outside the deactivation range between dxmin,off,j and dxmax,off,j. On the basis of the respectively selected operating state, it is additionally possible for the control unit 12 to open or close an output train of the vehicle that connects a drive motor of the vehicle to drive wheels of the vehicle, for example. The plurality of prescribed discrete operating states particularly comprise a constant driving mode, a freewheeling mode, a coasting mode, a sailing mode, a recuperation mode and a braking mode. In particular, an operating state in which a drive train of the vehicle is closed and the drive motor is dragged by the movement of the vehicle and the drive motor draws energy to decrease its drag braking is not used. The use of discrete operating states allows particularly this operating state that is inefficient from the point of view of energy to be avoided.

Figure 3:
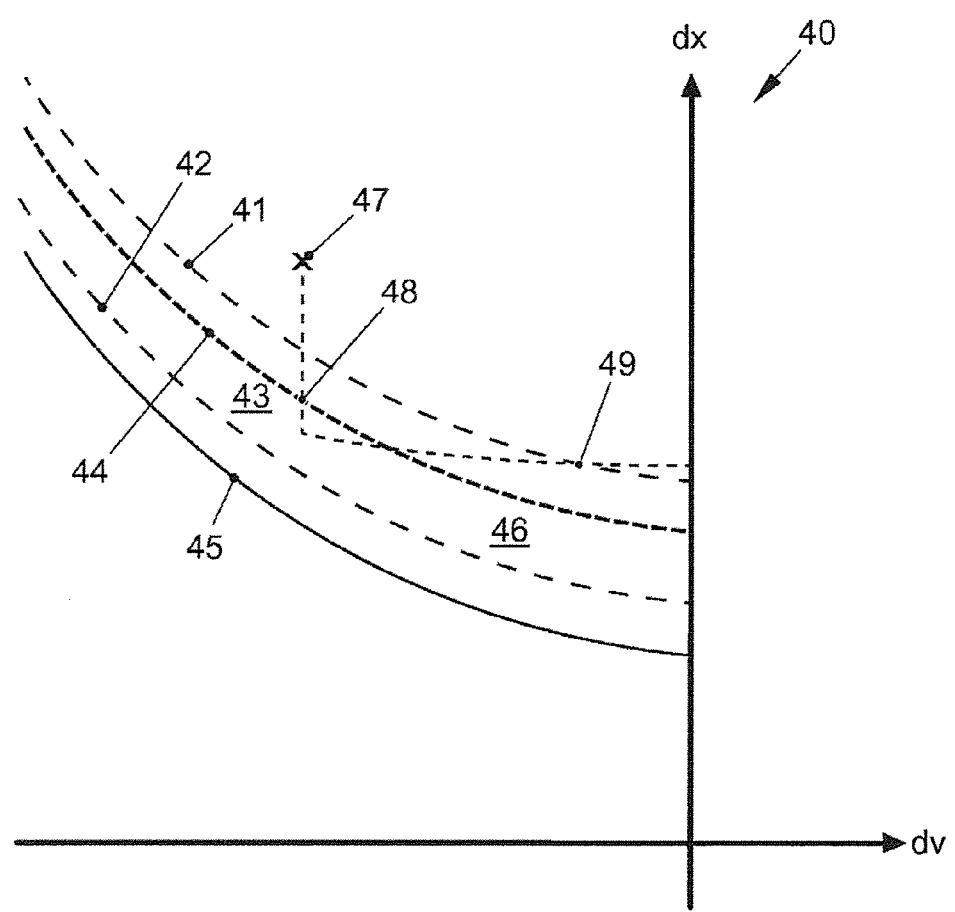
FIG. 3 shows overlapping distance ranges for activating and deactivating an operating state according to at least one disclosed embodiment.

FIG. 3 shows a graph 40 that shows an activation distance range 46 and a deactivation distance range 43 for a prescribed operating state. The activation distance range 46 is bounded by the lines 44 and 45. The deactivation distance range 43 is bounded by the lines 41 and 42. A vehicle moves at constant relative speed toward a vehicle traveling ahead. The vehicle is initially at a distance dx and a relative speed dv as shown by means of the cross 47 in FIG. 3. On account of the relative speed dv, the vehicle approaches the vehicle traveling ahead, which decreases the distance dx. The distance dx and the relative speed dv of the vehicle therefore follow the dashed line as far as the point 48. At the point 48, a prescribed operating state is activated that decelerates the vehicle in a suitable manner to set a desired distance dx to the vehicle traveling ahead. At the point 49, the vehicle has reached a relative speed dv and a distance dx in relation to the vehicle traveling ahead that correspond to the edge of the deactivation distance range 43. The previously set operating state is therefore left and another operating state is adopted. The use of the activation distance range 46 and the deactivation distance range 43 allows hysteresis to be realized, as a result of which it is possible to avoid frequent changes of operating state.

Figure 2:
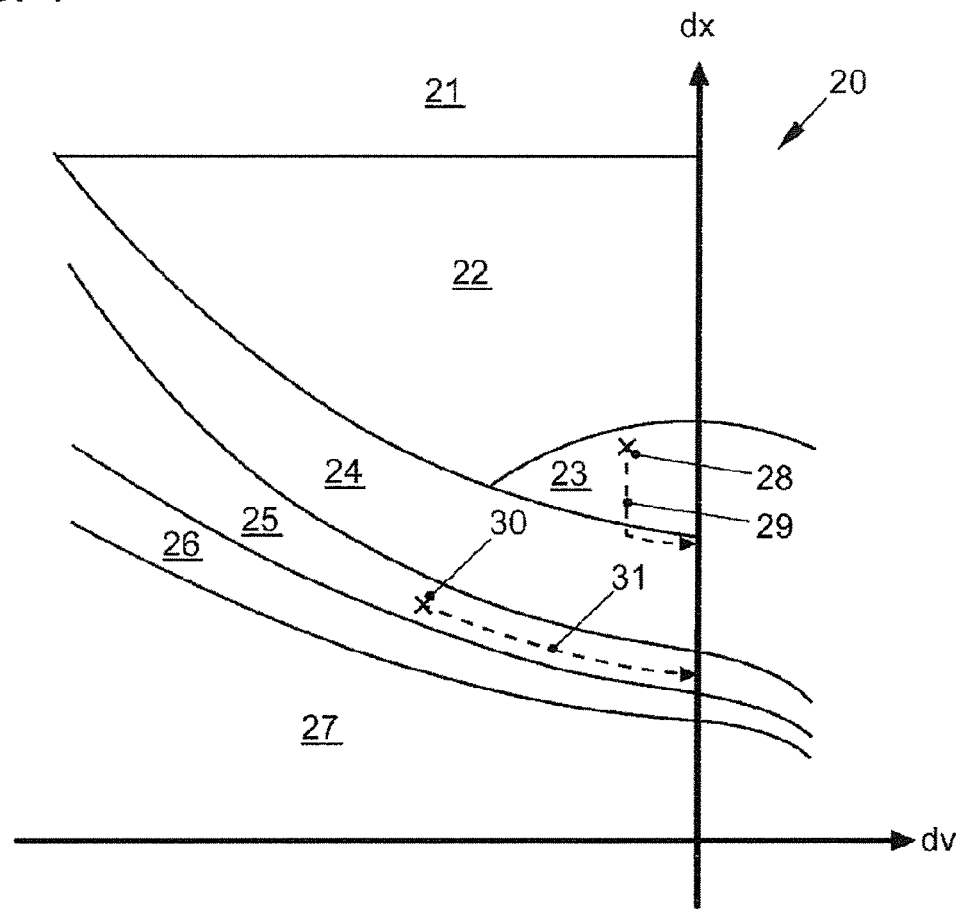
FIG. 2 schematically shows an association of distance ranges with discrete operating states according to at least one disclosed embodiment.

FIG. 2 shows a graph 20 in which, by way of example, various discrete operating states have associated distances dx and relative speeds dv that can be used when the vehicle approaches a vehicle traveling ahead. The range 21 denotes a range outside a sensor range of a sensor that is used for sensing the distance to the vehicle traveling ahead, i.e. in the range 21 the vehicle is traveling without a lead vehicle traveling ahead. In the range 22, the distance dx and the relative speed dv are of such magnitude in relation to a vehicle traveling ahead that it is possible to start acceleration travel provided that this is not limited by a speed regulation system, for example. In the range 23, constant speed is performed, i.e. the vehicle moves at constant speed. In the range 24, the vehicle is in freewheeling mode, i.e. the vehicle glides, with the drive train being open and the motor running in idling mode. In freewheeling mode, only very little deceleration is achieved. In the range 25, a coasting mode is used, in which the vehicle glides, the drive train being closed and the motor being dragged without drawing additional fuel. In the range 26, the vehicle is operated in a recuperation mode, in which the vehicle glides and kinetic energy is recovered. In the range 27, a braking mode is used, in which the vehicle glides and is additionally decelerated by means of friction brakes or the like, for example.

The operation of a vehicle is described below by way of example. The vehicle is at a relative speed dv in relation to the vehicle traveling ahead and a distance dx in relation to the vehicle traveling ahead, for example, as shown by means of the cross 28 in FIG. 2. The vehicle is in the constant speed mode of operation 23. As a result, the vehicle approaches the vehicle traveling ahead, which means that the distance dx becomes shorter. This is shown by the line 29. As soon as the vehicle drops below a predetermined distance dx, the vehicle is operated in freewheeling mode 24, as a result of which the speed and hence the relative speed dv of the vehicle become lower, which means that the distance dx then decreases only slightly. As soon as the relative speed dv has reached the value zero, the vehicle does not approach the vehicle traveling ahead further.

If a further vehicle then slides between the ego vehicle and the vehicle traveling ahead, the distance to the vehicle that is now traveling ahead alters abruptly and the corresponding relative speed dv may also change. Such a case is shown by means of the cross 30 in FIG. 2. On account of the short distance dx and the relatively high relative speed dv in relation to the vehicle that is now traveling ahead, the ego vehicle is operated in coasting mode 25, which decelerates the vehicle along the dashed line 31, which decreases the relative speed dv until a relative speed of zero is reached.

As has already been described above in connection with FIG. 3, the transitions between the individual operating states 22-27 in FIG. 2 can be provided with a hysteresis response to avoid frequent changes between the operating states.

Figure 4:
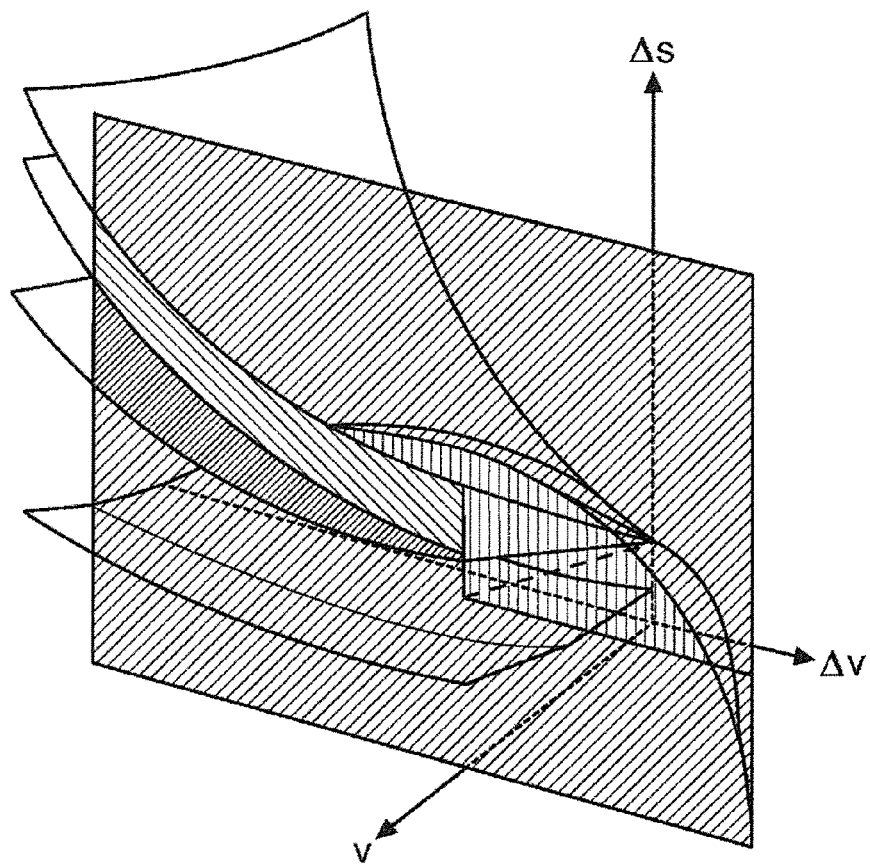
FIG. 4 shows a further illustration of the association of distance ranges, vehicle speeds and relative speeds with discrete operating states according to at least one disclosed embodiment.

FIG. 4 shows a graph showing various ranges for various discrete operating states of a driver assistance system when a vehicle approaches a vehicle traveling ahead on the basis of the differential speed Δv, the distance Δs and additionally the speed v of the vehicle itself.

In the description above, distances and distance ranges in relation to the vehicle traveling ahead have been used to select one of a plurality of prescribed operating states. However, such a distance or distance range can be defined not only by means of a distance in meters, for example, in relation to a vehicle traveling ahead but also by means of what is known as a time interval or what is known as a time interval range. In this case, a time interval indicates the time that the ego vehicle probably requires at the current speed to reach a current position of the vehicle traveling ahead. Hence, the time interval is a function of the distance from the ego vehicle to the vehicle traveling ahead and the absolute speed of the ego vehicle.

Figure 5:
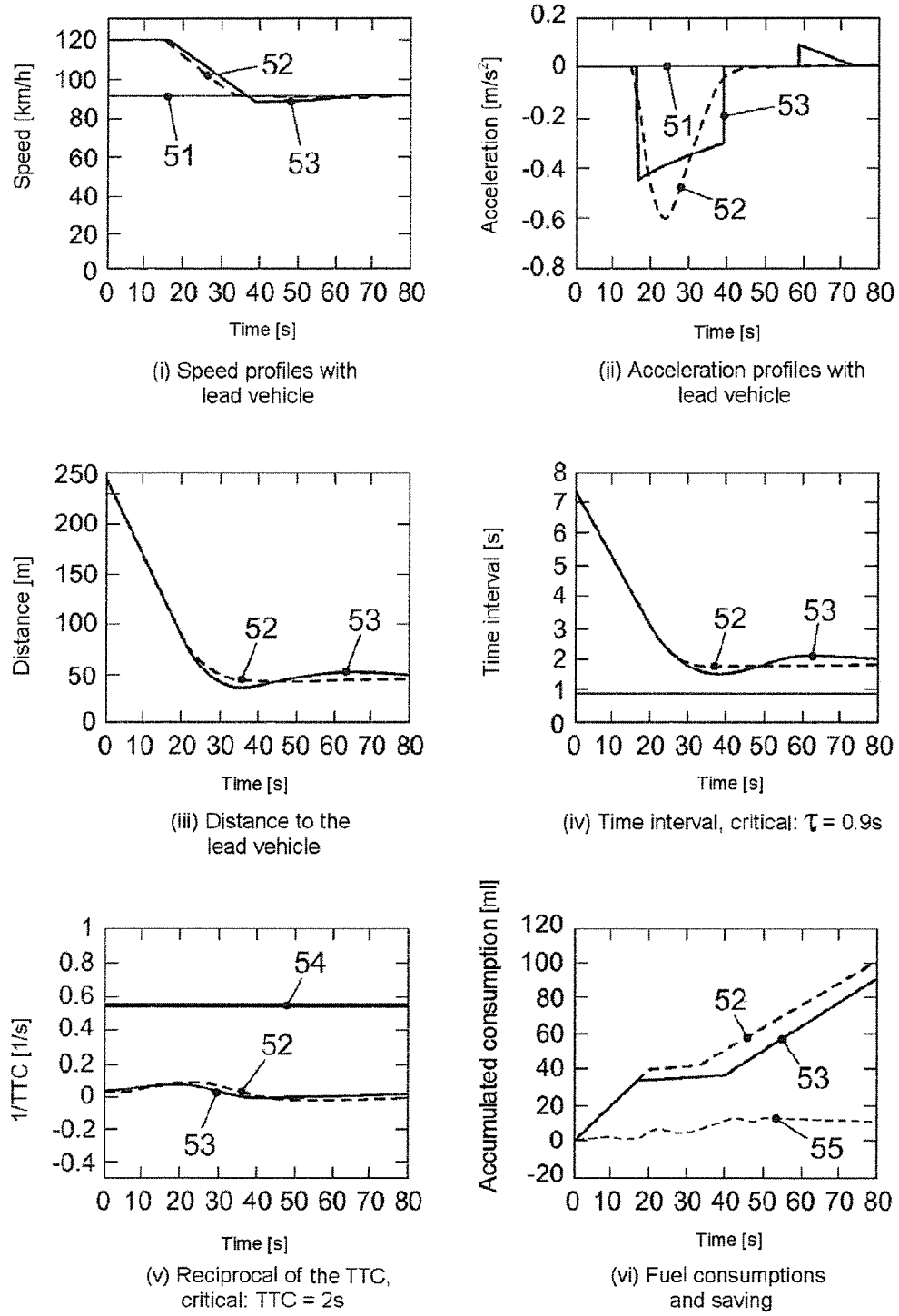
FIG. 5 schematically shows a response from a vehicle having a driver assistance system according to at least one disclosed embodiment in comparison with a vehicle having a conventional driver assistance system.

FIG. 5 shows a comparison for a vehicle having the inventive driver assistance system for distance regulation described above in comparison with a conventional distance regulation system according to the prior art, which is also referred to as adaptive cruise control (ACC). Graph (i) shows a speed profile 52 for a vehicle having conventional distance regulation in comparison with a speed profile 53 for an inventive vehicle when running into a lead vehicle at constant speed 51. The lead vehicle is traveling at an approximately constant speed of 90 km/h, for example. The ego vehicle approaches at 120 km/h, for example. Graph (ii) shows the acceleration profiles of the inventive vehicle (graph 53) and the vehicle according to the prior art (graph 52), which does not use any discrete operating states. When the ego vehicle approaches the lead vehicle, the inventive vehicle changes over from constant speed at acceleration zero to a freewheeling mode, for example, after it has reached a particular distance from the lead vehicle, as a result of which the deceleration of the vehicle rises sharply at first and then falls somewhat on account of the decreasing drag. At approximately 40 seconds, the desired target distance from the lead vehicle has been reached and the vehicle continues to travel at constant speed. The conventional vehicle, the acceleration profile of which is shown by means of graph 52, increases deceleration continuously as it approaches the lead vehicle, as a result of which it is possible for the drive motor to be operated in an inefficient operating state, for example, in which it is dragged by the vehicle but simultaneously requests power therefrom, and hence fuel is converted in the drive motor. The speed profiles of the two vehicles, as shown in graph (i), differ only insignificantly. The distance from the lead vehicle, which is shown in graph (iii), is also only slightly different in the case of the inventive vehicle (graph 53) than in the case of the conventional vehicle (graph 52). A corresponding profile for the time interval for the inventive vehicle (graph 53) and a vehicle according to the prior art (graph 52) are shown in graph (iv). In addition, a critical time interval of i=0.9 second is shown in graph (iv). As can be seen from graph (iv), although the time interval in the case of the inventive vehicle varies somewhat more sharply than in the case of the vehicle according to the prior art, the critical time interval is never undershot. Graph (v) shows the profile of the reciprocal of the time to collision (TTC) that would elapse before the ego vehicle runs into the lead vehicle if the ego vehicle were to continue to travel at constant speed. A critical value for the reciprocal value of the TTC is shown as a straight line 54 in graph (v). A profile for the reciprocal of the TTC for the inventive vehicle (graph 53) and the vehicle according to the prior art (graph 52) in graph (v) show that these values also do not differ substantially. Graph (vi) shows the fuel consumption of the inventive vehicle (graph 53) and a corresponding consumption for the vehicle according to the prior art (graph 52) and also a difference between the fuel consumptions (graph 55). As can be seen from graph (vi), the inventive method allows the fuel consumption to be reduced.

As can be seen from graphs (iii) and (iv), when setting the modes of operation it is consciously recorded that there is a drop below the set distance in the manner that is optimum in terms of energy to avoid braking, for example. The vehicle can then be operated in freewheeling mode a little longer, for example, to allow the vehicle traveling ahead to move away again so as then to arrive at the desired time interval or the desired distance.

Figure 6:
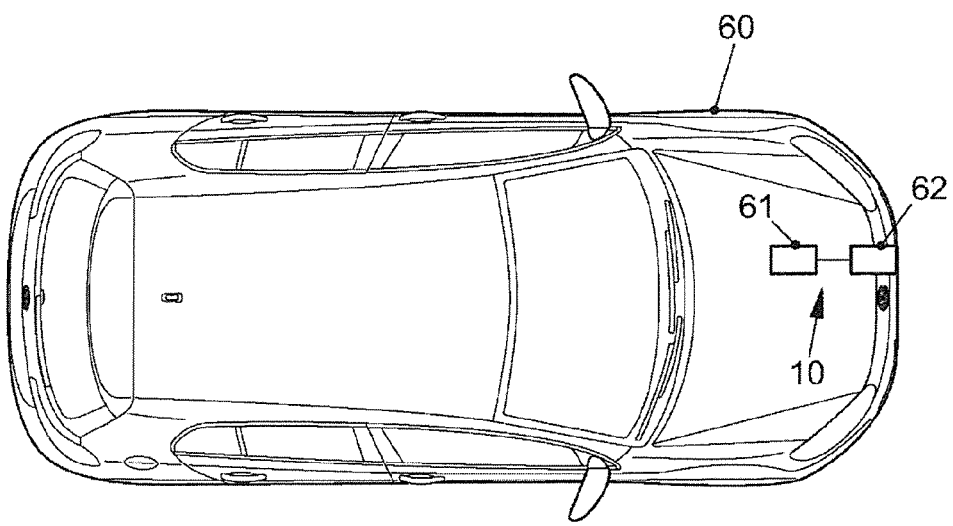
FIG. 6 shows a vehicle according to at least disclosed embodiment.

FIG. 6 shows a vehicle 60 according to at least one disclosed embodiment. The vehicle 60 comprises a driver assistance system 10 for regulating a distance to a vehicle traveling ahead, what is known as an adaptive cruise control system. The driver assistance system 10 comprises a sensor 62, for example a laser or radar sensor, for sensing a distance to a vehicle traveling ahead. The driver assistance system 10 additionally comprises a control unit 61 that is coupled to the sensor 62 and is designed to determine a relative speed between the vehicle 60 and a vehicle traveling ahead on the basis of a change in the distance between the vehicle 60 and the vehicle traveling ahead and to operate the vehicle in an operating state from a group of a plurality of prescribed operating states on the basis of the distance and the relative speed when the vehicle 60 approaches the vehicle traveling ahead. When a relatively slow vehicle is approached, a corresponding mode of operation is selected to achieve a preset or calculated distance in an energy-efficient manner. If a relatively slow vehicle is detected at a distance of approximately 250 meters, for example, it is possible to set the sailing mode, for example, so as to save as much energy as possible. If the ego vehicle approaches a relatively slow vehicle at high speed, on the other hand, it is possible to set the towing mode of operation, for example, to achieve sufficient deceleration. If a further vehicle slides between the ego vehicle and the vehicle traveling ahead in this state, sharper deceleration may be necessary. To allow this in a manner that is optimum in terms of energy, it is possible to set towing mode and recuperation mode, for example.

To be able to decrease or increase a distance to the vehicle traveling ahead on a user-specific basis, it is possible for the time interval, for example, as defined previously, to be adjustable by means of an adjustment option, for example, a roller on a steering wheel of the vehicle. A time range for the time interval may be adjustable in the range between 2 and 3 seconds, optionally between 2 and 2½ seconds, for example. Depending on the speed of the vehicle, this results in a distance range in relation to the vehicle traveling ahead.

The determination of distance ranges, with which operating states are then associated, taking account of speed and relative speed, as described above, can also be modified such that distance and speed are taken into account to determine a relative speed interval with which an operating state is associated. Similarly a speed interval can be determined from distance and relative speed.

In motor vehicles, for example in automobiles or heavy goods vehicles, driver assistance systems for automatically regulating the distance from the ego vehicle to a vehicle traveling ahead are known. Corresponding systems have been available for some time in various vehicle classes. Usually, sensors are used for ascertaining a distance between the ego vehicle and the vehicle traveling ahead, and this variable is taken as a basis for determining an acceleration requirement to adjust a defined desired target distance. This acceleration requirement is implemented by means of driving torques or braking torques in the vehicle, for example.

Furthermore, DE 10 2009 046341 A1, DE 10 2008 005328 A1 and DE 10 2009 028242 A1, for example, describe technical solutions for using gliding maneuvers for speed regulation in a vehicle. Furthermore, DE 10 2009 002521 A1 discloses a method for operating a vehicle with a sailing or rolling mode in which, by way of example, gliding maneuvers are deactivated in the event of imminent braking actions from a distance regulation system.

DE 10 2008 000696 A1 relates to a distance and speed regulator for motor vehicles. A limiting device that can be activated by the driver using an operator control element is designed to restrict a range of variation for an acceleration.

EP 2163449 A2 presents a system that determines a consumption-optimized torque taking account of a distance sensor system and uses a downstream decision-making unit to balance between this torque and a torque that the driver desires.

DE 10 2004 017115 A1 relates to a method for speed regulation for a vehicle with automatic transmission. The method allows the speed of travel to assume values in a range around the target speed. The method comprises an acceleration phase and a gliding phase of the vehicle. In the acceleration phase, the vehicle is accelerated to an upper threshold for the speed that is higher than the target speed. In the subsequent gliding phase, when the vehicle reaches a lower threshold for the speed, the vehicle is accelerated to the upper threshold for the speed again in the consumption-optimized range.

DE 10 2008 000131 A1 relates to a method for operating a vehicle in which the vehicle is operated on the basis of a current position of the vehicle and on the basis of surroundings information from the vehicle such that a driving energy for a vehicle that currently acts on the vehicle and is in addition to the driving force that can be produced by the drive device is used for operating the vehicle taking account of an expected operating state profile of the vehicle.

DE 10 2009 046340 A1 relates to a method for controlling a rolling or sailing function of a vehicle. So that the rolling or sailing function can be used as efficiently as possible and nevertheless terminated reliably and conveniently, a frictional connection in the drive train is restored on the basis of a selectable speed difference between the current vehicle speed and a lower limit speed stipulated by means of a vehicle speed regulatory device.

In the case of standard distance regulation systems, acceleration requirements occasionally arise that are between zero and a deceleration during gliding free of driving and braking force. These operating states are inefficient from the point of view of energy, since power is requested from the drive that is usually provided with poor efficiency.

The invention claimed is:

1. A method for a driver assistance system in a vehicle for controlling a distance from the vehicle to a further vehicle, the method comprising:
  determining a distance between the vehicle and the further vehicle;
  determining a relative speed between the vehicle and the further vehicle;
  determining whether the vehicle is approaching the further vehicle based on the relative speed;
  determining a target distance between the vehicle and the further vehicle based on a speed of the vehicle and the relative speed, which is a difference in speed of the vehicle from the further vehicle;
  when it is determined the vehicle approaches the further vehicle, operating the vehicle in an operating state selected from a plurality of prescribed operating states based on the distance, the target distance, and the relative speed;
  associating a respective activation distance range with each of the operating states of the plurality of prescribed operating states, wherein the respective activation distance range is determined based on the speed of the vehicle and the relative speed;
  associating a respective deactivation distance range with each of the operating states of the plurality of prescribed operating states, wherein the respective deactivation distance range is determined based on the speed of the vehicle and the relative speed;
  beginning operation of the vehicle in an operating state from the plurality of prescribed operating states when the vehicle approaches the further vehicle and the distance between the vehicle and the further vehicle is in the activation distance range associated with the operating state; and
  terminating operation of the vehicle in the previously begun operating state when the distance between the vehicle and the further vehicle leaves the deactivation distance range associated with the operating state.

2. The method of claim 1, wherein the plurality of prescribed operating states does not include an operating state in which a drive train of the vehicle between a drive motor of the vehicle and drive wheels of the vehicle is closed and the drive motor is dragged by the movement of the vehicle and the drive motor draws energy to decrease its drag braking.

3. The method of claim 1, wherein the plurality of prescribed operating states comprises at least one operating state in which a drive train of the vehicle is open.

4. The method of claim 1, wherein the plurality of prescribed operating states consists of:
  a constant speed mode, in which a drive motor of the vehicle drives the vehicle at constant speed;
  a freewheeling mode, in which a drive train of the vehicle is open and the drive motor is running;
  a coasting mode, in which the drive train of the vehicle is closed and the drive motor is dragged by the movement of the vehicle without drawing additional energy;
  a sailing mode, in which a drive train of the vehicle is open and the drive motor is switched off;
  a recuperation mode, in which kinetic energy from the vehicle is converted into an energy that can be stored in an energy store of the vehicle and is stored;
  a braking mode, in which a braking system of the vehicle is operated; and
  a combination of the operating states described above.

5. The method of claim 1, further comprising:
  associating a respective distance range with each of the operating states of the plurality of prescribed operating states, wherein the respective distance range is determined on the basis of a speed of the vehicle and the relative speed; and
  operating the vehicle in an operating state from the plurality of prescribed operating states when the vehicle approaches the further vehicle and the distance between the vehicle and the further vehicle is in the distance range associated with the operating state.

6. The method of claim 1, further comprising:
determining a model of vehicle dynamics of the vehicle; and
determining the target distance, the distance range, the activation distance range and/or the deactivation distance range additionally based on the model of the vehicle dynamics.

7. The method of claim 6, wherein the model of the vehicle dynamics is determined based on one or more of the following parameters:
vehicle mass;
drag coefficient;
reference area;
rolling resistance coefficient;
translation-dependent supplementary terms;
wind speed;
wind direction;
precipitation intensity;
gradient (α) of a section ahead of the vehicle;
road class;
number of lanes;
speed limit; and
overtaking restriction.

8. The method of claim 1, further comprising determining the target distance, the distance range, the activation distance range and/or the deactivation distance range additionally based on a driving mode set by a user of the vehicle, wherein the driving mode comprises a sports mode and an energy saving mode.

9. The method of claim 1, further comprising outputting a piece of information about the operating state in which the vehicle is operated and/or in which the vehicle will probably be operated next to a driver of the vehicle.

10. A driver assistance system for a vehicle for controlling a distance from the vehicle to a further vehicle, the system comprising:
a sensor for determining a distance between the vehicle and the further vehicle; and
a control unit that is designed to determine a relative speed between the vehicle and the further vehicle based on a change in the distance between the vehicle and the further vehicle, determine a target distance between the vehicle and the further vehicle based on a speed of the vehicle and the relative speed, and to operate the vehicle in an operating state from a plurality of prescribed operating states based on the distance, the target distance and the relative speed when the vehicle approaches the further vehicle, wherein the relative speed is a difference in speed of the vehicle from the further vehicle,
wherein the control unit is further designed to associate a respective activation distance range with each of the operating states of the plurality of prescribed operating states, wherein the respective activation distance range is determined based on the speed of the vehicle and the relative speed, associate a respective deactivation distance range with each of the operating states of the plurality of prescribed operating states, wherein the respective deactivation distance range is determined based on the speed of the vehicle and the relative speed, begin operation of the vehicle in an operating state from the plurality of prescribed operating states when the vehicle approaches the further vehicle and the distance between the vehicle and the further vehicle is in the activation distance range associated with the operating state, and terminate operation of the vehicle in the previously begun operating state when the distance between the vehicle and the further vehicle leaves the deactivation distance range associated with the operating state.

11. The driver assistance system of claim 10, wherein the plurality of prescribed operating states does not include an operating state in which a drive train of the vehicle between a drive motor of the vehicle and drive wheels of the vehicle is closed and the drive motor is dragged by the movement of the vehicle and the drive motor draws energy to decrease its drag braking.

12. The driver assistance system of claim 10, wherein the plurality of prescribed operating states comprises at least one operating state in which a drive train of the vehicle is open.

13. The driver assistance system of claim 10, wherein the plurality of prescribed operating states consists of:
a constant speed mode, in which a drive motor of the vehicle drives the vehicle at constant speed;
a freewheeling mode, in which a drive train of the vehicle is open and the drive motor is running;
a coasting mode, in which the drive train of the vehicle is closed and the drive motor is dragged by the movement of the vehicle without drawing additional energy;
a sailing mode, in which a drive train of the vehicle is open and the drive motor is switched off;
a recuperation mode, in which kinetic energy from the vehicle is converted into an energy that can be stored in an energy store of the vehicle and is stored;
a braking mode, in which a braking system of the vehicle is operated; and
a combination of the operating states described above.

14. The driver assistance system of claim 10, wherein the control unit is further designed to associate a respective distance range with each of the operating states of the plurality of prescribed operating states, wherein the respective distance range is determined on the basis of a speed of the vehicle and the relative speed, and to operate the vehicle in an operating state from the plurality of prescribed operating states when the vehicle approaches the further vehicle and the distance between the vehicle and the further vehicle is in the distance range associated with the operating state.

15. The driver assistance system of claim 10, wherein the control unit is further configured to determine a model of vehicle dynamics of the vehicle; and determine the target distance, the distance range, the activation distance range and/or the deactivation distance range additionally based on the model of the vehicle dynamics.

16. The driver assistance system of claim 10, wherein the model of the vehicle dynamics is determined based on one or more of the following parameters:
vehicle mass;
drag coefficient;
reference area;
rolling resistance coefficient;
translation-dependent supplementary terms;
wind speed;
wind direction;
precipitation intensity;
gradient (α) of a section ahead of the vehicle;
road class;
number of lanes;
speed limit; and
overtaking restriction.

17. The driver assistance system of claim 1, wherein the control unit is further designed to determine the target distance, the distance range, the activation distance range and/or the deactivation distance range additionally based on a driving mode set by a user of the vehicle, wherein the driving mode comprises a sports mode and an energy saving mode.

18. The driver assistance system of claim 10, wherein the control unit is further designed to output a piece of information about the operating state in which the vehicle is operated and/or in which the vehicle will probably be operated next to a driver of the vehicle.

19. A vehicle comprising
a driver assistance system including a sensor for determining a distance between the vehicle and the further vehicle,
wherein the driver assistance system also includes a control unit that is designed to determine a relative speed between the vehicle and the further vehicle based on a change in the distance between the vehicle and the further vehicle, determine a target distance between the vehicle and the further vehicle based on a speed of the vehicle and the relative speed, and to operate the vehicle in an operating state from a plurality of prescribed operating states based on the distance, the target distance and the relative speed when the vehicle approaches the further vehicle, wherein the relative speed is a difference in speed of the vehicle from the further vehicle,
wherein the control unit is further designed to associate a respective activation distance range with each of the operating states of the plurality of prescribed operating states, wherein the respective activation distance range is determined based on the speed of the vehicle and the relative speed, associate a respective deactivation distance range with each of the operating states of the plurality of prescribed operating states, wherein the respective deactivation distance range is determined based on the speed of the vehicle and the relative speed, begin operation of the vehicle in an operating state from the plurality of prescribed operating states when the vehicle approaches the further vehicle and the distance between the vehicle and the further vehicle is in the activation distance range associated with the operating state, and terminate operation of the vehicle in the previously begun operating state when the distance between the vehicle and the further vehicle leaves the deactivation distance range associated with the operating state.

20. The vehicle of claim 19, wherein the plurality of prescribed operating states does not include an operating state in which a drive train of the vehicle between a drive motor of the vehicle and drive wheels of the vehicle is closed and the drive motor is dragged by the movement of the vehicle and the drive motor draws energy to decrease its drag braking.

21. The vehicle of claim 19, wherein the plurality of prescribed operating states comprises at least one operating state in which a drive train of the vehicle is open.

22. The vehicle of claim 19, wherein the plurality of prescribed operating states consists of:
a constant speed mode, in which a drive motor of the vehicle drives the vehicle at constant speed;
a freewheeling mode, in which a drive train of the vehicle is open and the drive motor is running;
a coasting mode, in which the drive train of the vehicle is closed and the drive motor is dragged by the movement of the vehicle without drawing additional energy;
a sailing mode, in which a drive train of the vehicle is open and the drive motor is switched off;
a recuperation mode, in which kinetic energy from the vehicle is converted into an energy that can be stored in an energy store of the vehicle and is stored;
a braking mode, in which a braking system of the vehicle is operated; and
a combination of the operating states described above.

23. The vehicle of claim 19, wherein the control unit is further designed to associate a respective distance range with each of the operating states of the plurality of prescribed operating states, wherein the respective distance range is determined on the basis of a speed of the vehicle and the relative speed, and to operate the vehicle in an operating state from the plurality of prescribed operating states when the vehicle approaches the further vehicle and the distance between the vehicle and the further vehicle is in the distance range associated with the operating state.

24. The vehicle of claim 19, wherein the control unit is further configured to determine a model of vehicle dynamics of the vehicle; and determine the target distance, the distance range, the activation distance range and/or the deactivation distance range additionally based on the model of the vehicle dynamics.

25. The vehicle of claim 19, wherein the model of the vehicle dynamics is determined based on one or more of the following parameters:
vehicle mass;
drag coefficient;
reference area;
rolling resistance coefficient;
translation-dependent supplementary terms;
wind speed;
wind direction;
precipitation intensity;
gradient ($\alpha$) of a section ahead of the vehicle;
road class;
number of lanes;
speed limit; and
overtaking restriction.

26. The vehicle of claim 19, wherein the control unit is further designed to determine the target distance, the distance range, the activation distance range and/or the deactivation distance range additionally based on a driving mode set by a user of the vehicle, wherein the driving mode comprises a sports mode and an energy saving mode.

27. The vehicle of claim 19, wherein the control unit is further designed to output a piece of information about the operating state in which the vehicle is operated and/or in which the vehicle will probably be operated next to a driver of the vehicle.

* * * * *